Sept. 11, 1951        R. E. BURKE        2,567,872
TREE ENGAGING DEVICE FOR TREE SHAKING APPARATUS
Filed Nov. 22, 1948
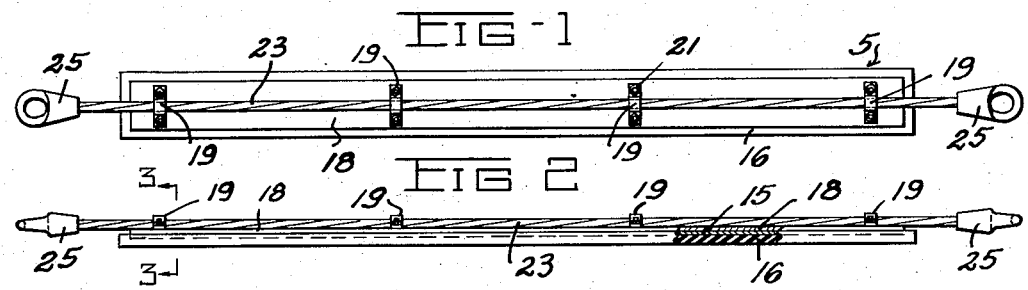
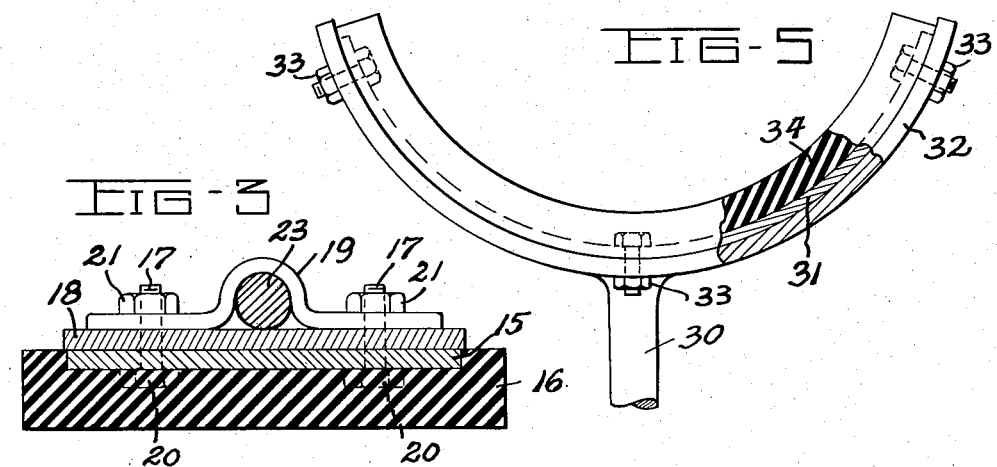
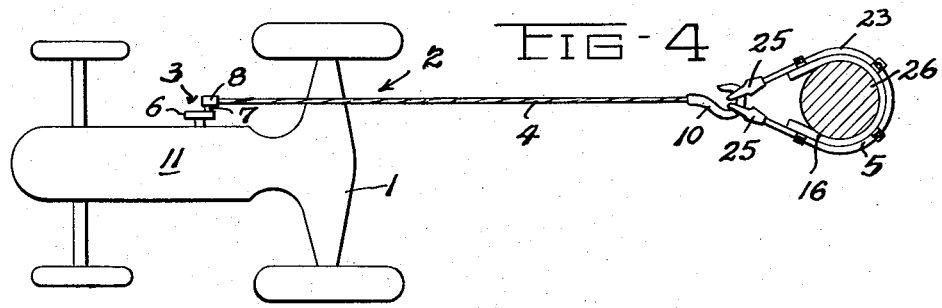
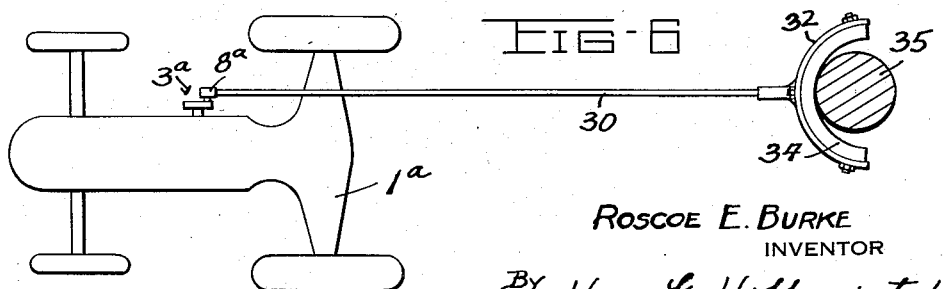
ROSCOE E. BURKE
INVENTOR
BY Hans G. Hoffmeister
ATTORNEY Patented Sept. 11, 1951

2,567,872

UNITED STATES PATENT OFFICE 2,567,872

TREE ENGAGING DEVICE FOR TREE SHAKING APPARATUS

Roscoe E. Burke, San Jose, Calif.

Application November 22, 1948, Serial No. 61,396

2 Claims. (Cl. 56—328)

The present invention appertains to tree shaking apparatus and relates more particularly to a device for engaging the branches or the trunk of a tree to transmit the vibration of the shaking mechanism to the same.

One object of the present invention is to provide a tree engaging device for tree shaking apparatus which will prevent damage to the trunk or branches of the tree to which it is attached.

Another object is to provide a tree engaging device which will improve the action of the shaking apparatus to produce a more rapid and thorough removal of the fruit or nuts from the tree.

A further object is to provide a tree engaging device for tree shaking apparatus which will not injure the bark of the tree.

Another object is to provide a tree engaging device which will remain in the applied position and will not slip in a vertical or horizontal direction irrespective of the direction of pull or push thereon.

Another object is to provide a tree engaging device which will cushion the action of the shaking apparatus to thereby reduce the jolt on the shaking equipment.

Other and further objects and advantages will become apparent from the following description and drawings in which:

Fig. 1 is a plan view of a tree engaging device of the present invention.

Fig. 2 is a side view of Fig. 1.

Fig. 3 is a section of Fig. 2 taken along line 3—3 thereof.

Fig. 4 is a plan view of a tractor provided with a tree shaking mechanism including the tree engaging device shown in Figs. 1 to 3 inclusive.

Fig. 5 illustrates a modified construction of tree engaging device.

Fig. 6 is a plan view of a tractor and tree shaking apparatus including the modified tree engaging device shown in Fig. 5.

Referring now to the drawings and especially Fig. 4 thereof 1 indicates a tractor provided with a tree shaking apparatus 2 including an actuator 3, a cable 4 and a tree engaging member 5.

The actuator 3 may be of any conventional construction such as for instance a power driven disc 6 provided with a pin 7 eccentrically disposed relative thereto. Rotatably mounted on the pin 7 is a bearing 8 to which in turn the steel cable 4 provided with a hook 10 is attached.

The actuator 3 is driven by the engine 11 of the tractor in any convenient manner and the pin 7 may be adjustable relative to the disc 6 so as to permit variation of the eccentricity of the pin with respect to the axis of rotation of the disc.

The tree engaging device 5, shown in Figs. 1 to 4 inclusive, is in the form of a belt structure and comprises a canvas belt 15 (Fig. 3) to which a heavy strip of rubber 16 is vulcanized. Attached to the canvas belt 15 by means of bolts 17 are another canvas belt 18 and a plurality of straps 19 arranged in spaced relationship as shown in Fig. 1.

The heads 20 of the bolts 15 are embedded in the heavy rubber strip or padding 16, as best seen from Fig. 3, and the canvas belt 18 and straps 19 are firmly held in position when the nuts 21 of the bolts are tightened.

Extending through the straps 19 and held in position thereby on the canvas belt 18 is a flexible steel cable 23 the free ends of which extend beyond the ends of the rubber strip 16 which is somewhat longer and wider than the canvas belt 15 vulcanized thereto. Secured to the free ends of the cable 23 are eyelets 25.

In use the cable structure 5 is slung around the trunk or a branch of a tree 26 with the rubber strip 16, lying directly against the tree, as shown in Fig. 4 and the tractor 1 is placed in the proper position. The cable 4 is attached to the belt 5 by introducing the hook 10 into the eyelets 25. Thereupon the tractor is backed away from the tree until the cable 4 is taut and the tractor brakes are applied. The actuator 3 is set into operation and as the actuator rotates a shaking motion is imparted to the tree by the cable 4 and belt 5 due to the eccentricity of the pin 7 with respect to the axis of rotation of the disc 6.

The shaking action or vibration transferred to the tree by the belt structure 5 is intensified due to the resiliency of the rubber strip 16. In other words the rebound action of the rubber increases the frequency of the shaking vibrations so that a shorter and snappier shaking action and therefore a quicker and more thorough removal of all fruit or nuts on the tree is obtained. The rubber strip 16 should therefore have the proper resiliency to assure the above action.

The rubber padding 16 of the belt structure 5 protects the trunk or branch of the tree as well as the bark thereof and also prevents slipping of the belt in vertical or horizontal direction even though the direction of pull on the belt structure may not be at an angle of 90 degrees with respect to the trunk or branch of the tree. Furthermore the resiliency of the rubber padding 16 reduces the jolt on the tractor 1, engine 11 and actuator 3 whereby damage to the tractor and shaking apparatus is efficiently prevented.

The shaker belt structure 5 is of light weight and can therefore be readily applied and removed by a single person.

The modified structure of tree engaging device shown in Figs. 5 and 6 is designed for push type shakers which employ a rigid rod 30 secured to an actuator 3a by a bearing 8a in a similar manner as the cable 4 to the actuator 3 in Fig. 4 above referred to.

In this modified construction a canvas belt 31 (Fig. 5) is secured to a metal yoke 32 by means of bolts 33 and vulcanized to the canvas belt 31 is a heavy rubber strip or padding 34 which is slightly longer and wider than the canvas belt 31.

When this modified structure is employed the tractor 1a (Fig. 6) is driven toward the tree trunk or branch 35 while the rod 30 is held by an attendant in the proper position to engage the tree 35. When the rubber padding 34 is in firm contact with the tree the tractor brakes are locked and the actuator is set in motion thereby effecting shaking of the tree.

The modified structure of Fig. 6 offers the same advantages as the construction shown in Fig. 4 and the additional advantage that the tree engaging member may be placed into position on high branches directly vertically above the tractor without the use of a ladder.

I desire it to be understood that the present invention is not limited to the particular application or precise details of construction illustrated, but that various applications, modifications and variations may be resorted to without departing from the spirit or scope of the invention, and I deem myself entitled to all such applications, modifications and variations as come within the scope of the claims appended hereto.

Having thus described my invention, what I claim as new and desire to protect by Letters Patent is:

1. A tree engaging device for tree shaking apparatus comprising a canvas belt, a padding of resilient material bonded to said belt, a second canvas belt secured to said first belt, a plurality of straps secured to said second belt, and a flexible cable held in position on said second belt by said straps for securing the tree engaging device to the tree shaking apparatus.

2. A tree engaging device comprising superimposed canvas belts, means for securing said belts to each other, a plurality of straps attached to one of said belts by said securing means, a rubber belt vulcanized to the other of said canvas belts and extending beyond the margins of the same, and a flexible cable extending through said straps for securing the tree engaging device to the actuating mechanism of a tree shaking apparatus.

ROSCOE E. BURKE.

REFERENCES CITED

The following references are of record in the file of this patent:

UNITED STATES PATENTS

| Number | Name | Date |
|---|---|---|
| 1,379,391 | Brown | May 24, 1921 |
| 1,725,523 | Keys | Aug. 20, 1929 |
| 2,090,059 | McClane | Aug. 17, 1937 |
| 2,159,311 | Berger | May 23, 1939 |

OTHER REFERENCES

"The Mechanical Tree Shaker," Diamond Walnut News, vol. 25, #4, July 1943, pages 4–6.